United States Patent Office 3,498,380
Patented Mar. 3, 1970

3,498,380
METHOD FOR PLACING GRAVEL PACKS
Derry D. Sparlin, Ponca City, Okla., and William C. Bond, Casper Wyo., assignors to Continental Oil Company, Ponca City, Okla., a corporation of Delaware
No Drawing. Continuation-in-part of application Ser. No. 647,597, June 21, 1967. This application Mar. 28, 1969, Ser. No. 811,678
Int. Cl. E21b 43/04
U.S. Cl. 166—278                 13 Claims

ABSTRACT OF THE DISCLOSURE

A method of gravel packing a well comprising pumping into the well at a low pump rate a slurry of a high concentration of finely divided solid particulate matter, such as gravel, suspended in a viscous carrier liquid.

Cross-reference to related applications

This application is a continuation-in-part of copending application Ser. No. 647,597, filed June 21, 1967.

BACKGROUND OF THE INVENTION

Field of the invention

This invention relates to methods of completing wells such as oil, gas, condensate, water, or geothermal wells wherein particulated material, such as gravel, is positioned in a wellbore against a permeable incompetent formation to minimize the migration of sand and other granular material from the formation into the well when fluids are subsequently produced from or injected into the formation. More particularly, the invention relates to an improved method for transporting the gravel material to and maintaining it at a desired location in the wellbore.

Description of the prior art

The technique of "gravel packing" to restrict the passage of sand or other particulate matter from a subterranean formation into a well penetrating the formation is well known, particularly in the art of oil and gas production. Gravel packing basically consists of mixing a selected size-grading of gravel, sand, cement clinker or other material in a fluid carrier, such as fresh water, brine, oil, or gas, and pumping the resulting slurry down the annulus between the wellbore wall and a centrally located well screen or perforated liner. The fluid carrier filters through the screen and is returned to the surface leaving a porous permeable "pack" of granular material between the wall of the wellbore and the well screen. This porous pack substantially reduces the migration of particles from the formation into the well and the attendant problems of equipment erosion and wellbore plugging when fluids are produced from or injected into the formation.

More recently a technique of pressure packing has evolved in which back pressure in the well is maintained sufficiently high so that when the gravel slurry is pumped into the well most of the carrier fluid filters into the formation and the gravel pack created is forced back into the formation. Pressure packing creates a more intimate contact between the formation face and the gravel pack, replaces low permeability formation sand with high permeability gravel around the wellbore, and in effect increases the effective diameter of the wellbore.

Similarly, the particulate matter may be placed in a wellbore against a permeable incompetent formation without placement of a liner. In another variation, once the particulate matter is placed in the wellbore, it is consolidated with plastic or other consolidating materials according to well known techniques. It can be seen that the success of all these operations involving placing particulate matter in a well against a subterranean formation, referred to generally as "gravel packing," lies in the establishment of a highly permeable pack so that fluids can easily pass through the pack. Previous gravel packs have employed relatively large sized gravel, such as 13 to 17 mesh or larger. Such packs have relatively large pore openings and initially have the desired high permeability. However, these large pore openings are easily invaded by the loose small formation sand particles and the permeability of the pack is often sharply reduced soon after the well is put in service. It would be desirable to employ carefully graded smaller sized gravel which is closer to the size of the formation sand. However, it has been the experience that when gravel smaller than about 17 mesh is used the permeability of the resulting pack is decreased much more sharply due to mixing with formation sand than is the case when larger gravel is used and mixes with a like amount of formation sand. Thus, when employing the desired small size gravel it is especially important to reduce to a minimum the mixing of the gravel with formation sand during placement of a pack.

Previous gravel packing techniques have employed a relatively low concentration of gravel in the carrier liquid, such as a slurry of 1.0 pound or less gravel per gallon carrier. It has been the experience with slurries having a higher concentration of gravel that the gravel tends to separate out and plug pumps and lines at the surface between the slurry mixing equipment and the well conduit, as well as bridge at restrictions in the well conduit and fail to reach its desired location. However, these previously used low gravel concentration slurries are undesirable from the standpoint that a greater volume of slurry must be pumped to place a given quantity of gravel in the pack. Thus, the possibility of undesirable mixing of the gravel with formation sand is increased when more slurry is pumped. Also, when a pack is formed by forcing the carrier liquid out into the formation, it is desirable to use as high a concentration of gravel as possible, since a formation-invading carrier liquid oftentimes damages the formation by reducing the permeability thereof and the amount of carrier liquid forced into the formation should be held to a minimum. For example, oil base carrier liquids can cause asphaltene precipitation in the formation. Water base carrier liquids can cause clay swelling, emulsion formation and growth of bacteria.

Even with slurries containing a low concentration of gravel, it has been the practice to employ a relatively high pump rate of 4 to 6 barrels slurry per minute or higher down the well in an attempt to keep the gravel from falling out of the slurry prematurely. However, a high pump rate is self defeating in that this, too, increases the chances of undesirable mixing of the gravel with formation sand, since the slurry moves against the formation face and through perforations, if present, with greater force at high pump rates, causing turbulent mixing. This mixing is a reduction of permeability of the completed gravel pack due to the inclusion of the finer sand particles within the interstices or pore spaces of the gravel pack. Correspondingly, the flow capacity, productivity and injectivity of the well are reduced.

Objects of the invention

An object of this invention is to increase the productivity and/or injectivity of wells in which a gravel pack is placed.

Another object is to provide the effectiveness of the gravel pack placed in a well.

A further object is to reduce the mixing of formation sand and other particles with the gravel pack material, when the latter is pumped in a slurry form into a wellbore.

A still further object is to provide a gravel pack placement technique which allows formation of a permeable gravel pack from relatively small sized gravel.

Other objects, advantages and features of this invention will be apparent from the following detailed description and claims.

Brief summary of the invention

The invention involves a method of gravel packing a well using a slurry of a high concentration of small sized gravel in a viscous carrier liquid. Preferably, the slurry is pumped into its downhole position at a low pump rate.

Description of the preferred embodiments

The term "gravel" includes any particulate material, such as gravel, sand, cement clinker, ground nut shells or other material usable in a gravel packing operation. In a gravel packing treatment, gravel is placed in the wellbore area against a permeable formation. This wellbore area or void space may extend out through perforations if the well is cased. The gravel supports the formation walls, prevents caving of loose material against the liner and serves to restrain sand from unconsolidated and disintegrating strata so that it may not enter the well. The gravel particles should be of the smallest size necessary to screen out the smaller formation particles and yet not smaller than necessary to avoid unduly restricting the permeability of the well. Generally, gravel having a size of less than 20 mesh (U.S. Bureau of Standards, Standard Screen Series) down to about 100 mesh is satisfactory. The gravel also should be screened within narrow size limits, e.g., 20 to 40 mesh, etc., to insure the higher permeability obtainable with particles having a narrow size range limit.

It is required that the carrier fluid have sufficient viscosity to maintain the gravel in suspension while the slurry is being pumped downhole. The carrier fluid may be either an aqueous base or an oil base liquid. Suitable aqueous base liquids include water, brine and water base drilling muds. Suitable oil base liquids include hydrocarbon oils and oil base drilling muds. To obtain the requisite viscosity, thickening or gelling agents are sometimes added to the carrier liquid. Water base liquids may be thickened by addition thereto of natural or synthetic gums such as guar gum, polysaccharides such as sugar, polymers such as polyacrylamide, cellulose derivatives such as methyl cellulose and the like. For example, water can be gelled to a viscosity of 50 centipoises with 0.72 percent by weight guar gum and to a viscosity of 100 centipoises with 1.2 percent guar gum. Oil base liquids may be thickened by adding thereto a soap such as sodium palmitate or aluminum octoate, finely divided silica, bentonite or the like. For example, from 20 to 50 pounds sodium palmitate or finely divided silica per 1,000 gallons of a thin crude oil or distillate such as diesel oil or kerosene provides a carrier having a viscosity of more than 50 cps. Some crude oils and refined oils inherently have the requisite viscosity or are even too viscuos. The viscosity of especially viscous oils can be adjusted downwardly into the range recommended for a carrier liquid by blending therewith a thin crude oil or a refined oil such as kerosene or diesel oil. The carrier liquid, regardless of type, should have a viscosity of from 50 to 2000 cps., preferably from 100 to 500 cps., for the best results.

The slurry used for placement of the gravel pack should contain between about 10 and about 35 pounds particulate matter per gallon of carrier liquid. The preferred range is from 15 to 20 pounds per gallon. Using this high concentration of particulate matter, the gravel pack is formed by movement of a minimum volume of fluid against the formation. Thus, a minimum amount of formation sand is picked up and mixed with the injected particulate matter. The resulting gravel pack will have a desired high permeability.

Previously, relatively high pump rates have been employed in emplacing gravel pack slurries in order to insure proper placement of the gravel before it gravity separates from the carrier liquid to too great an extent. Using the viscous carrier liquid of this invention, it was found that, even at the high gravel concentrations recommended, the slurry pump rate could be reduced to less than 2 barrels per minute, i.e., 84 gallons per minute. Preferably, the slurry is pumped at a rate between 1 barrel per minute and 0.1 barrel per minute. Above 2 barrels per minute, mixing of the gravel with formation sand begins to become a problem. At a pumping rate of lower than 0.1 barrel per minute, gravel will tend to fall out of suspension even when using a viscous carrier.

A portion of the technique for placing the gravel pack of our invention is that now conventionally used. In the most commonly used technique, a tubing string having a screen member extending downwardly therefrom is positioned in the well at the desired depth within the screen member opposite the permeable formation. This formation may be completely exposed, as in an "open hole" completion, or may be partially supported by perforated or slotted casing. A slurry of gravel in a viscous carrier fluid is pumped down the annulus between tubing and casing to the location of the screen member where the carrier fluid is filtered through the screen and flowed up the interior of the centrally located tubing string. The gravel material is filtered out and remains in place between the screen and formation. If it is desirable to carry out pressure packing, the carrier fluid is not returned through the tubing string but is forced out into the formation with continued injection of the slurry mixture. When sufficient gravel slurry has been injected into the wellbore annulus, pumping is stopped and the well is returned to service.

The method of mixing the gravel and carrier is accomplished in any of several known ways. The carrier fluid for example can be piped to the wellhead and the gravel metered into the flow line from a storage hopper attached by a conduit to the flow line.

Well example

A water injection well in Southern Oklahoma with perforated casing from 3936 to 4025 feet had a long history of sand problems. Several sand control methods had been attempted and all were unsuccessful. In one such treatment the well was packed with 15,000 pounds of 10–20 mesh sand and 4400 pounds of 4–8 mesh sand without a liner. Two months later, formation sand filled the casing to within 6 feet of the top perforations.

Two sand screen liners of about 100 feet length were run and gravel packed with no success either time. The last liner was cleaned out and 15 days later formation sand had filled 60 feet inside the liner. It costs approximately $6,000 each time this well is cleaned out.

The liner was pulled from the previous gravel pack and the hole cleaned out. A wire wrapped liner 140 feet long with 0.015 inch wire spacing was centralized across the perforated interval. A blend of viscous crude and diesel oil was mixed to a viscosity of 314 cp. at 118° F. A proportioning blender was used to mix 15 pounds of 20–40 U.S. mesh size sand with each gallon of the crude oil-diesel oil carrier blend in a continuous operation as a pump truck pumped the mixture into the well at a rate of 0.5 barrel per minute. The slurry was pumped down the tubing-casing annulus around the screen and out of the casing perforations. Mixing and pumping were continued until a sharp increase in surface pressure of 1000 p.s.i. occurred. At that time, 96,000 pounds of sand had been pumped into the well along with 151 barrels of carrier liquid.

The excess sand above the screen was washed out with water and the well was then prepared for injection. Before the job, the best injection rate was approximately 2400 barrels per day at 3000 p.s.i., and after the job the same rate was established at 2500 to 3000 p.s.i. Thus, the injectivity was the same as or better than it was prior to this sand pack. Six months after this treatment, the injection rate was approximately the same and only the lower 20 feet of perforations were covered by sand. The treatment was considered a success.

As many possible embodiments may be made of the invention without departing from the scope thereof, it is to be understood that all matter herein set forth is to be interpreted as illustrative and not in a limiting sense.

The invention having been described, what is claimed is:

1. A method of treating a wellbore comprising injecting into the wellbore opposite a permeable formation a slurry of from 10 to 25 pounds solid particulate matter having a size of from 20 to 100 mesh per one gallon of carrier liquid having a viscosity of from 50 to 2000 centipoises to create a permeable deformable plastic deposit of said particulate matter against the formation face, thereby minimizing migration of sand and other granular materials into the wellbore from the permeable formation when the well is placed in service.

2. The method of claim 1 wherein the carrier liquid is water containing a thickening agent.

3. The method of claim 1 wherein the carrier liquid is water containing guar gum.

4. The method of claim 1 wherein the carrier liquid is a crude oil.

5. The method of claim 1 wherein the carrier liquid is soap-thickened distillate.

6. The method of claim 1 wherein the solid particulate matter is gravel.

7. The method of claim 1 wherein the slurry is injected into the wellbore at a rate of from 0.1 to 2 barrels per minute.

8. The method of claim 1 wherein the solid particulate matter has a size range of from 20 to 40 mesh.

9. The method of claim 1 wherein the solid particulate matter has a size range of from 40 to 60 mesh.

10. A method of forming a pack of solid particulate matter in a wellbore penetrating a permeable formation and containing a well screen attached to tubing and positioned opposite said permeable formation comprising injecting down the annular space around the tubing a slurry of from 10 to 35 pounds solid particulate matter having a size of from 20 to 100 mesh per one gallon of carrier liquid having a viscosity of from 50 to 2000 centipoises, forcing said slurry against the formation and screen whereby carrier liquid is forced out of the slurry through either the screen or the formation and the solid particulate matter is screened out and deposited in said wellbore.

11. The method of claim 10 wherein the slurry is injected into the well at a rate of from 0.1 to 2 barrels per minute.

12. The method of claim 10 wherein the solid particulate matter has a size range of from 20 to 40 mesh.

13. The method of claim 10 wherein the solid particulate matter has a size range of from 40 to 60 mesh.

References Cited

UNITED STATES PATENTS

| | | | |
|---|---|---|---|
| 2,814,347 | 11/1957 | MacKnight | 166—278 |
| 2,905,245 | 9/1959 | De Priester | 166—278 X |
| 3,062,284 | 11/1962 | Brown | 166—278 |
| 3,277,962 | 10/1966 | Flickinger | 166—278 |
| 3,428,128 | 2/1969 | Jones | 166—278 |
| 3,434,540 | 3/1969 | Stein | 166—278 X |

NILE C. BYERS, JR., Primary Examiner